(12) United States Patent
Baida

(10) Patent No.: US 6,880,260 B2
(45) Date of Patent: Apr. 19, 2005

(54) DEVICE AND METHOD FOR MAKING PRECISE MEASUREMENTS AND CUTS WITH A MEASURING TAPE

(76) Inventor: Nicholas F. Baida, 255 Woodbrook Dr., Grants Pass, OR (US) 97526

( * ) Notice: Subject to any disclaimer, the term of this patent is extended or adjusted under 35 U.S.C. 154(b) by 0 days.

(21) Appl. No.: 09/992,172

(22) Filed: Nov. 14, 2001

(65) Prior Publication Data

US 2003/0088993 A1 May 15, 2003

(51) Int. Cl.$^7$ .............................................. G01B 3/10
(52) U.S. Cl. ......................................... 33/668; 33/760
(58) Field of Search ................. 33/668, 755, 759–761, 33/765–770, 27.02, 27.03, 27.031, 27.032

(56) References Cited

U.S. PATENT DOCUMENTS

| | | | | |
|---|---|---|---|---|
| 812,322 A | * | 2/1906 | Badger | 33/27.02 |
| 2,976,614 A | * | 3/1961 | Matuszewski et al. | 33/27.03 |
| 3,577,641 A | * | 5/1971 | Smith | 33/27.02 |
| 3,731,389 A | | 5/1973 | King | |
| 4,542,589 A | | 9/1985 | Yamamoto | |
| 4,649,649 A | * | 3/1987 | Fain | 33/761 |
| 4,760,648 A | | 8/1988 | Doak et al. | |
| 5,154,006 A | | 10/1992 | Wooster | |
| 5,295,308 A | * | 3/1994 | Stevens et al. | 33/769 |
| 5,349,760 A | * | 9/1994 | DeVito | 33/761 |
| 5,430,952 A | * | 7/1995 | Betts | 33/760 |
| 5,435,074 A | * | 7/1995 | Holevas et al. | 33/668 |
| 5,477,619 A | * | 12/1995 | Kearns | 33/27.03 |
| 5,577,329 A | * | 11/1996 | States | 33/768 |
| 5,671,543 A | | 9/1997 | Sears | |
| 5,815,939 A | | 10/1998 | Ruffer | |
| 6,178,655 B1 | * | 1/2001 | Potter et al. | 33/668 |
| 6,309,129 B1 | * | 10/2001 | Kageyama et al. | 401/104 |
| 6,434,854 B1 | * | 8/2002 | MacColl et al. | 33/668 |
| 6,581,296 B1 | * | 6/2003 | Ponce | 33/760 |
| 6,701,635 B1 | * | 3/2004 | Scarborough | 33/761 |
| 2002/0073568 A1 | * | 6/2002 | Johnson | |
| 2004/0123479 A1 | * | 7/2004 | Tufts et al. | 33/768 |

* cited by examiner

*Primary Examiner*—Diego Gutierrez
*Assistant Examiner*—Yaritza Guadalupe
(74) *Attorney, Agent, or Firm*—Reed Smith LLP

(57) ABSTRACT

A measuring tape 50 for making precision measurements with the use of one hand comprising a precision unit is disclosed. The precision unit has a back surface, a side surface, a bottom surface, which is constructed from clear or see through material and includes an indicator line. The precision unit further includes a marker housing part, which, in the preferred embodiment, is interchangeable with the side surface to allow for individual preferences. In an alternative embodiment the side surface may be replaced by a second marker housing part to allow for two marks to be made at the same time. The marker housing part includes a marker and a marker hold/release part to allow the marker to slide in and out of the marker housing part.

16 Claims, 13 Drawing Sheets

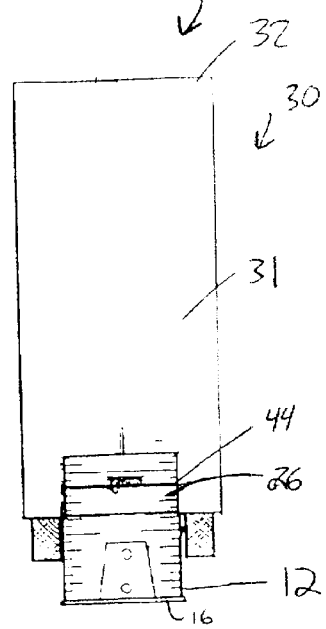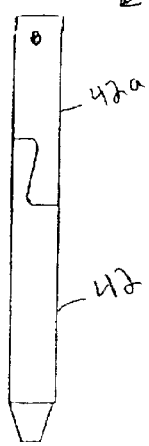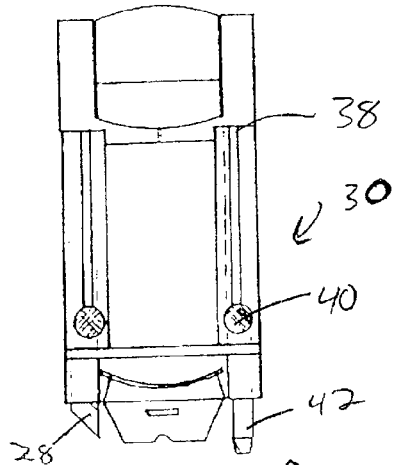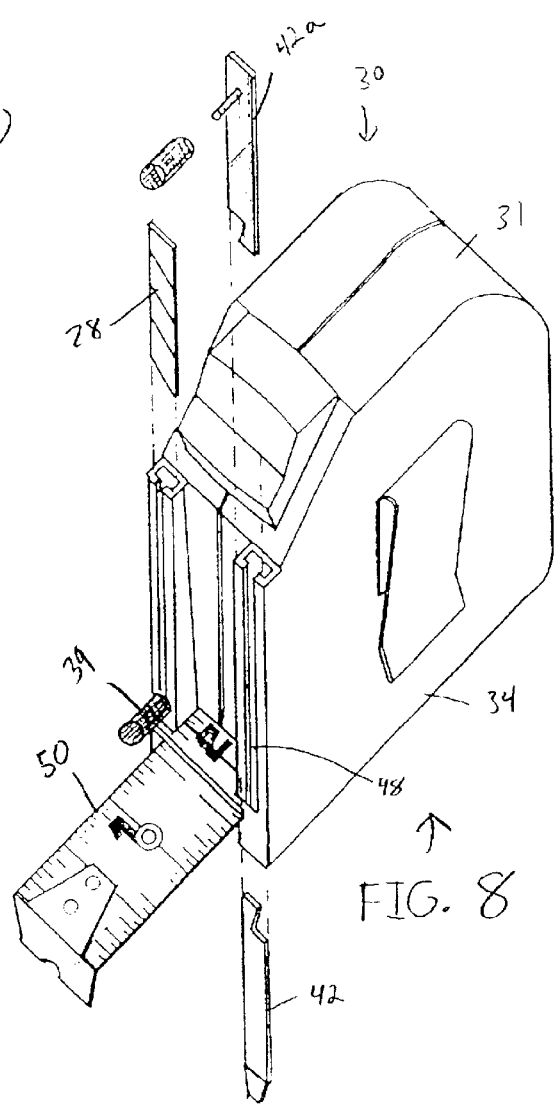

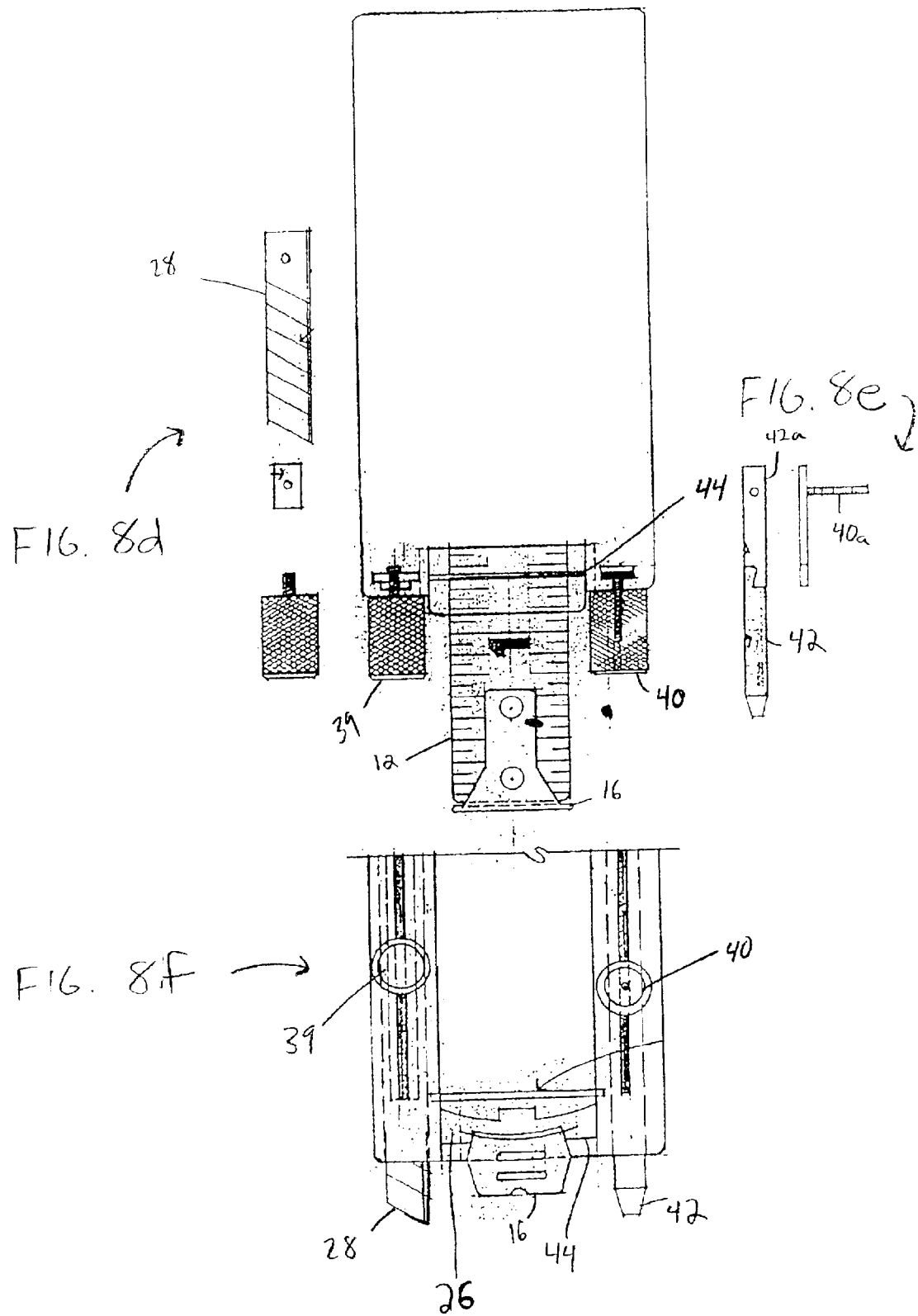

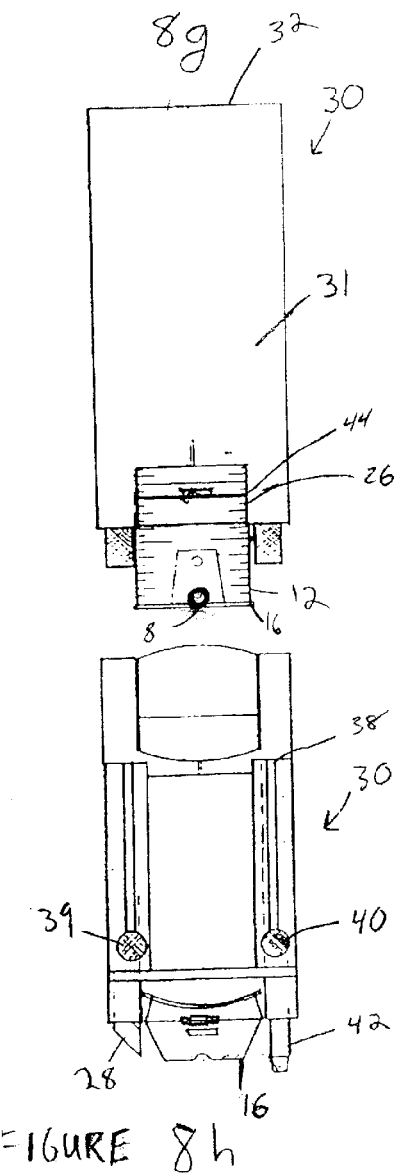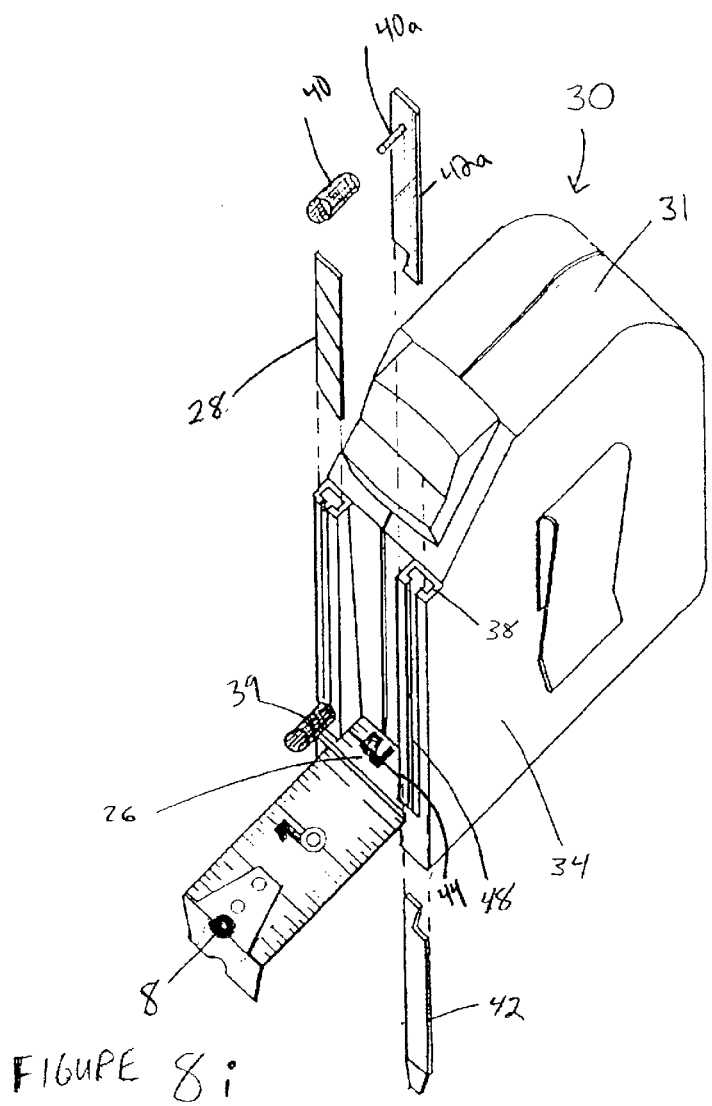

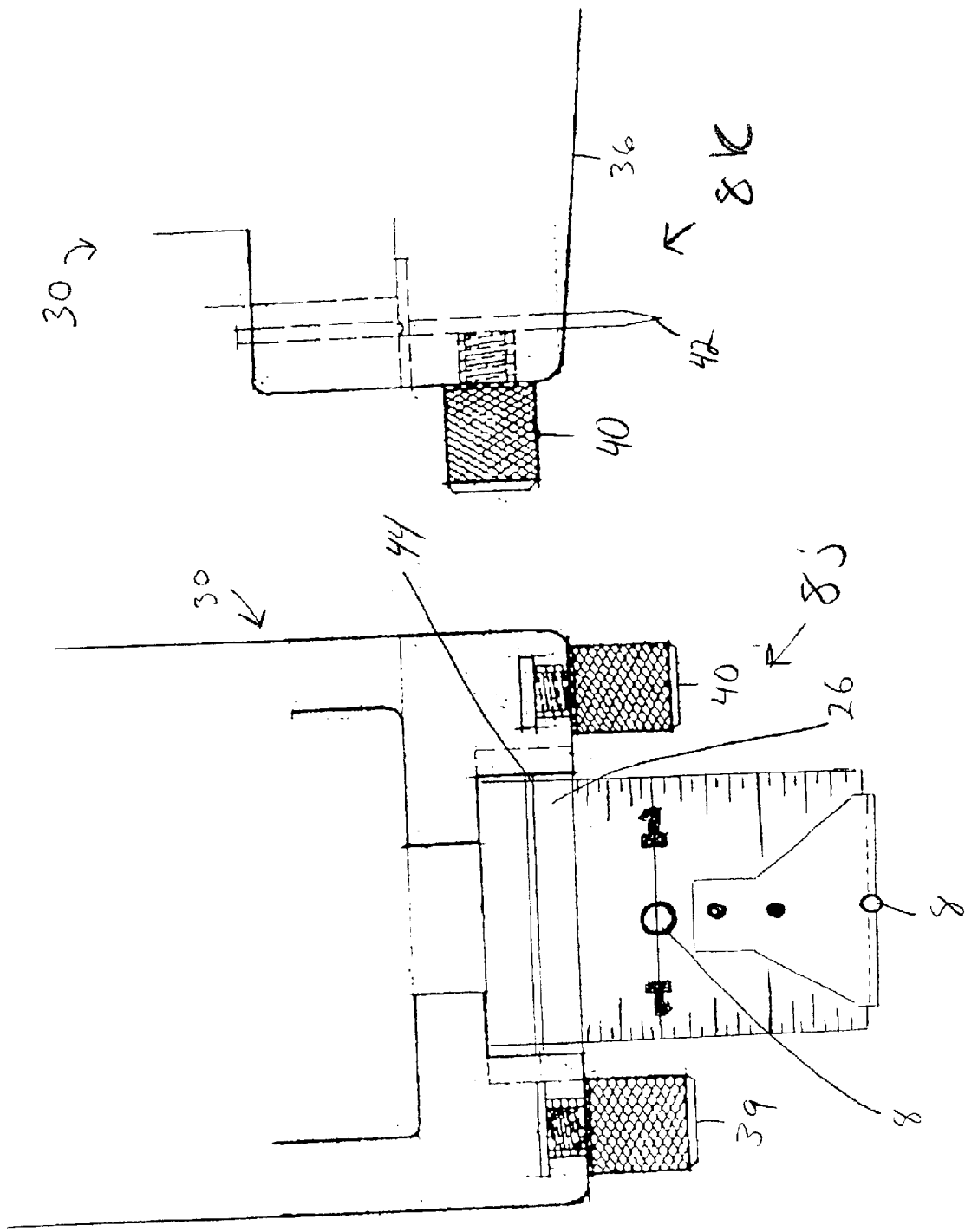

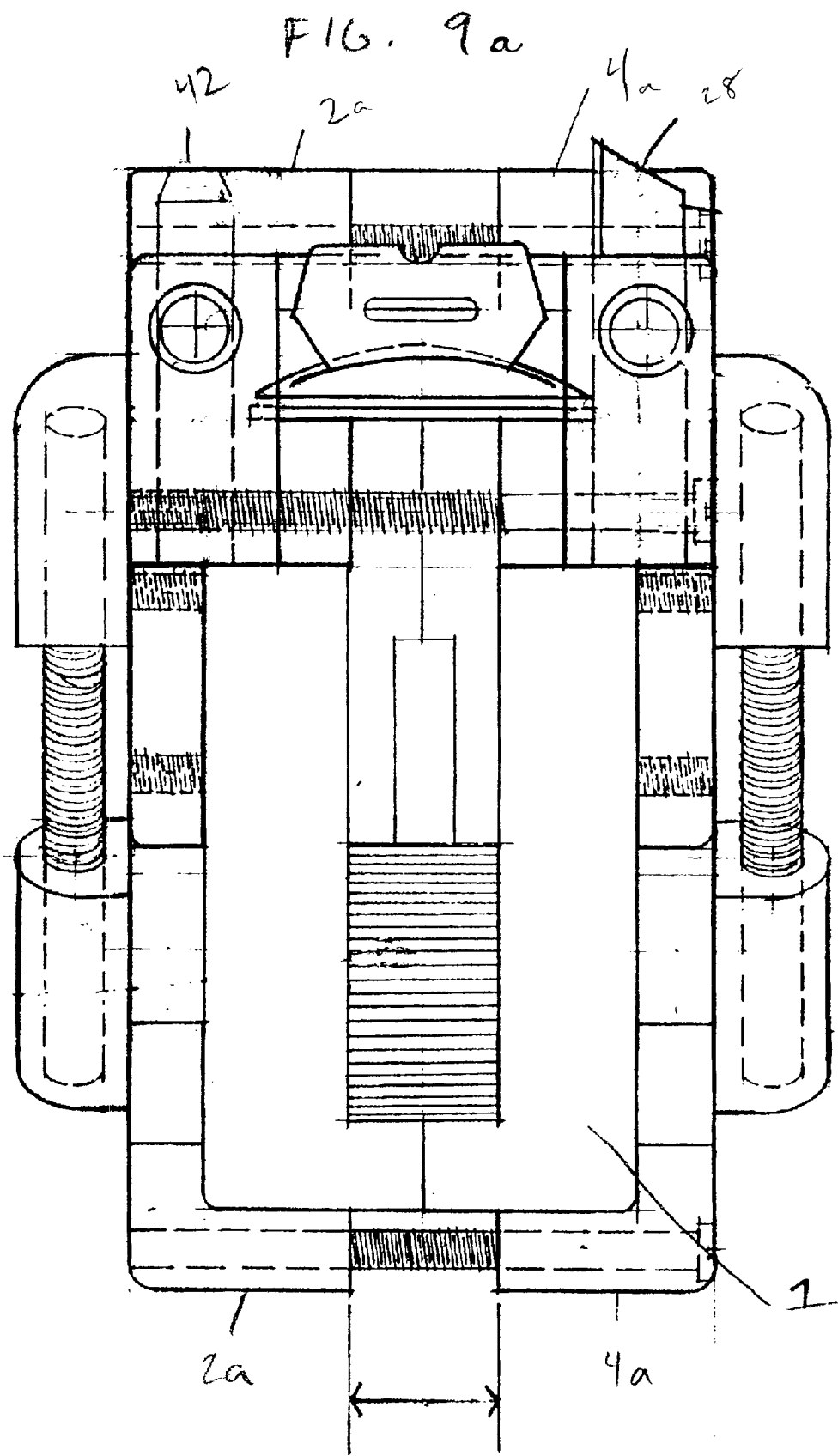

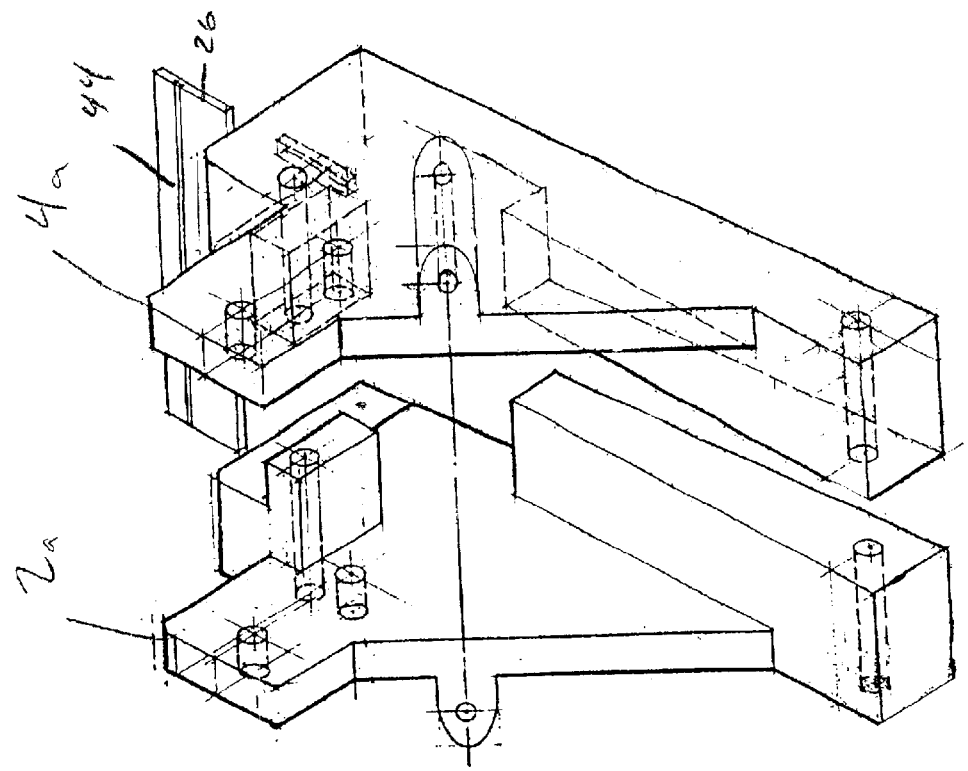
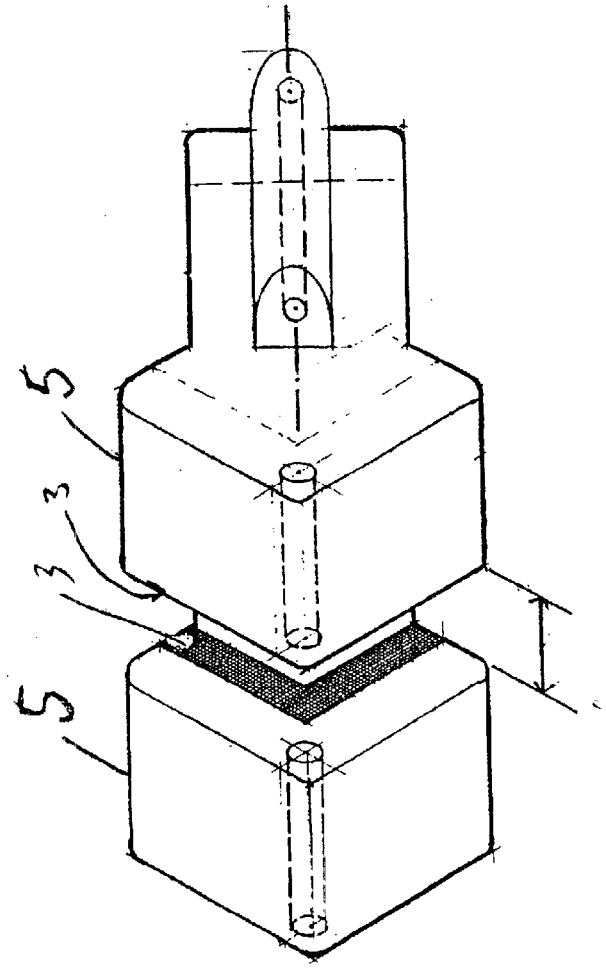
FIG. 9b

DEVICE AND METHOD FOR MAKING PRECISE MEASUREMENTS AND CUTS WITH A MEASURING TAPE

FIELD OF THE INVENTION

The present invention relates to the field of tape measures.

BACKGROUND OF THE INVENTION

There is a need for a device that allows one-handed precision measurements to be performed while the item being measured is also marked with one hand. The common measuring tape, commonly used in construction, for which the inventive improvement is proposed, has evolved over the last one hundred years into an easily operated tool familiar to millions of people. Its use, however, requires the use of two hands, one for holding the measuring tape and the other for marking the item being measured.

As is well known, typical prior art measuring tape devices have a measuring tape element, which is rolled up and enclosed in a standard rectangular case. The tape is rolled up inside the case with one of its two ends affixed inside the case to prevent it from slipping out. The second, free end of the tape element is capped by a lip and used to hook the tape element to edges of surfaces being measured. The lip also functions to prevent the second end from being pulled inside the case. The tape element is marked with markings having associated numbers which indicate the exact distance from the markings to the lip. The case has a case surface from which the tape protrudes, and a surface on which the hold/release knob is located. The hold/release knob permits the tape element to unroll, roll up, or be held in place while in the unrolled state.

Numerous unsuccessful attempts have been made to improve the measuring tape 50 to enable making measurements with one hand. For example, U.S. Pat. No. 5,154,006 adds to a standard measuring tape 50 a clip for holding a pencil which can be used to make markings after a surface distance has been measured. This approach is supposed to allow a workman to make a measurement and leave a mark using only one hand. However, because of the free movement of the clipped pencil, the measurement itself is not precise and the pencil is not safe from breakage if kept with other tools as is commonly done.

An attempted improvement on the above design was made in the U.S. Pat. No. 5,671,543, wherein the pencil could be affixed to the measuring tape 50 in such a way that it will not be moved by a slight force. The problem with this approach is that it was designed for a carpenter's pencil which is quite large, and thus the whole device is bulky because the structure holding the pencils is also quite large. Holding the device is also uncomfortable and the storage of such device with other tools would usually either break the pencil or break the marking tip off of the pencil. Additional time would be required either to sharpen the pencil or to replace it. If the pencil breaks as it is being used, the workman will have to stop all work and use two hands to move the pencil to its proper position.

U.S. Pat. No. 4,542,589 offers a solution to the problem of the pencil size by putting it inside the casing of the measuring tape 50. However, the marking pencil is located in such a way so as to force the workman to bend the measuring tape 50 every time the mark is to be made. Bending increases the wear and tear on the measuring tape 50. The measuring tape 50 can easily be bent over or under the location of the wanted mark; therefore, the precision of the measurement can not be guaranteed. Moreover, valuable time must be wasted when the workman is forced to repeat the marking step over and over until the correct mark is found.

Finally, U.S. Pat. No. 4,760,648 adds a clip to a standard tape measure 1, which holds a pencil on a support which is secured to one side of the tape measure housing. This pencil and support extend from the standard tape measure 1 and therefore can be easily bent and damaged when stored with other tools. This would easily cause the loss of precision of the measurement and unnecessarily waste time in fixing the pencil. The pencil can neither be fixed nor placed in a proper position with only one hand.

Therefore, the invention overcomes the various problems of the prior art by providing a device that allows the workman to make measurements, with a precision measuring to the smallest fraction increment on the tape of the tape measuring device. That device, furthermore, should not lose its precision with common wear and tear of the measuring tape 50 or increase the wear and tear on the tape by forcing a bending of the tape, and allow the measurements to be achieved and the measured surface to be marked with one hand. The invention can also enable all the marking and cutting elements to be more flush and integrated into a tape measure case than is known.

It is also the purpose of this invention to retrofit existing measuring tapes 50 purchased by millions of people and allow those measuring tape devices to be used as described above for making precise measurements while using only one hand, by using the additional embodiment with a shell casing which encloses a standard tape measure 1.

SUMMARY OF THE INVENTION

The invention relates to a shell casing for enclosing a case of a standard tape measure. The invention comprises a first concave shell with malleable interior sections, a second concave shell with malleable interior sections, and adjustable connection means for connecting the first concave shell to the second concave shell thereby enclosing the case of the tape measure. A razor blade may be also connected to at least one of the concave shells. The razor blade may be a retractable razor blade, and may be molded into at least one of the concave shells wherein the retractable razor blade is molded flush within the concave shell. A lead pencil may be connected to at least one of the concave shells. A retractable lead pencil molded into at least one of the concave shells may be used wherein the retractable lead pencil is molded flush within the concave shell.

The invention also relates to a combination tool comprising a tape measure in a case with a retractable cutting blade located inside the case and arranged to make cuts corresponding to measurement increments arranged on a tape measure. The tape measure may include a nail hole at its exposed end. A retractable pencil may be adapted to use interchangeable leads or limestone. The retractable lead pencil may be a mechanical lead pencil molded into said case in a flush manner. A clear indicator window may be located proximate to the tape with an index line located in line with the measurement increments. Also, a measurement mark may be made in pencil by extending a retractable pencil lead corresponding to the measurement marks on the tape measure 1.

The invention also discloses a method of making a cut in the object at a measured distance by extending a retractable blade located inside the case wherein the blade is arranged to make cuts corresponding to measurement increments arranged on the tape measure 1. Viewing can also be enabled and accomplished through a clear window located or positioned above the measurement increments to view and line up the measurement increments with an index line which corresponds measurement increments on said tape measure 1. The method may also include the steps of including a nail hole in the tape measure 1 at an exposed end and inserting a nail through the nail hole into the object, and rotating the case about the nail in an arc to make a circular measured cut in the object.

BRIEF DESCRIPTION OF DRAWINGS

FIG. 8 is an isometric view of the preferred embodiment of the present invention.

FIG. 8a is a plan view of the embodiment of FIG. 8.

FIG. 8b is a front view of an embodiment shown in FIG. 8.

FIG. 8c is a side view of the rectangular lead pencil with a retaining notch at the tip used in FIG. 8.

FIG. 8d is a plan view of the embodiment shown in FIG. 8.

FIG. 8e is a side view showing the retainer for the lead pencil in the embodiment of FIG. 8.

FIG. 8f is a front view of the embodiment of FIG. 8 showing a view window with an index line.

FIG. 8g is a plan view of the preferred embodiment of the present invention wherein a hole is provided at the tip of the measuring tape 50.

FIG. 8h is a front view of the embodiment of FIG. 8g wherein a hole is provided at the tip of the measuring tape 50.

FIG. 8i is an isometric view of the embodiment of FIG. 8g wherein a hole is provided in the measuring tape 50.

FIG. 8j is a plan view of the embodiment of FIG. 8g wherein a hole is located at the end of the measuring tape 50.

FIG. 8k is a side view of a retainer show for a lead or a razor blade of the embodiment shown in FIG. 8g.

FIG. 9a is a front view of another embodiment of the invention.

FIG. 9b is an isometric view of the embodiment of FIG. 9.

DETAILED DESCRIPTION OF PREFERRED EMBODIMENTS OF THE INVENTION

Figure 1:
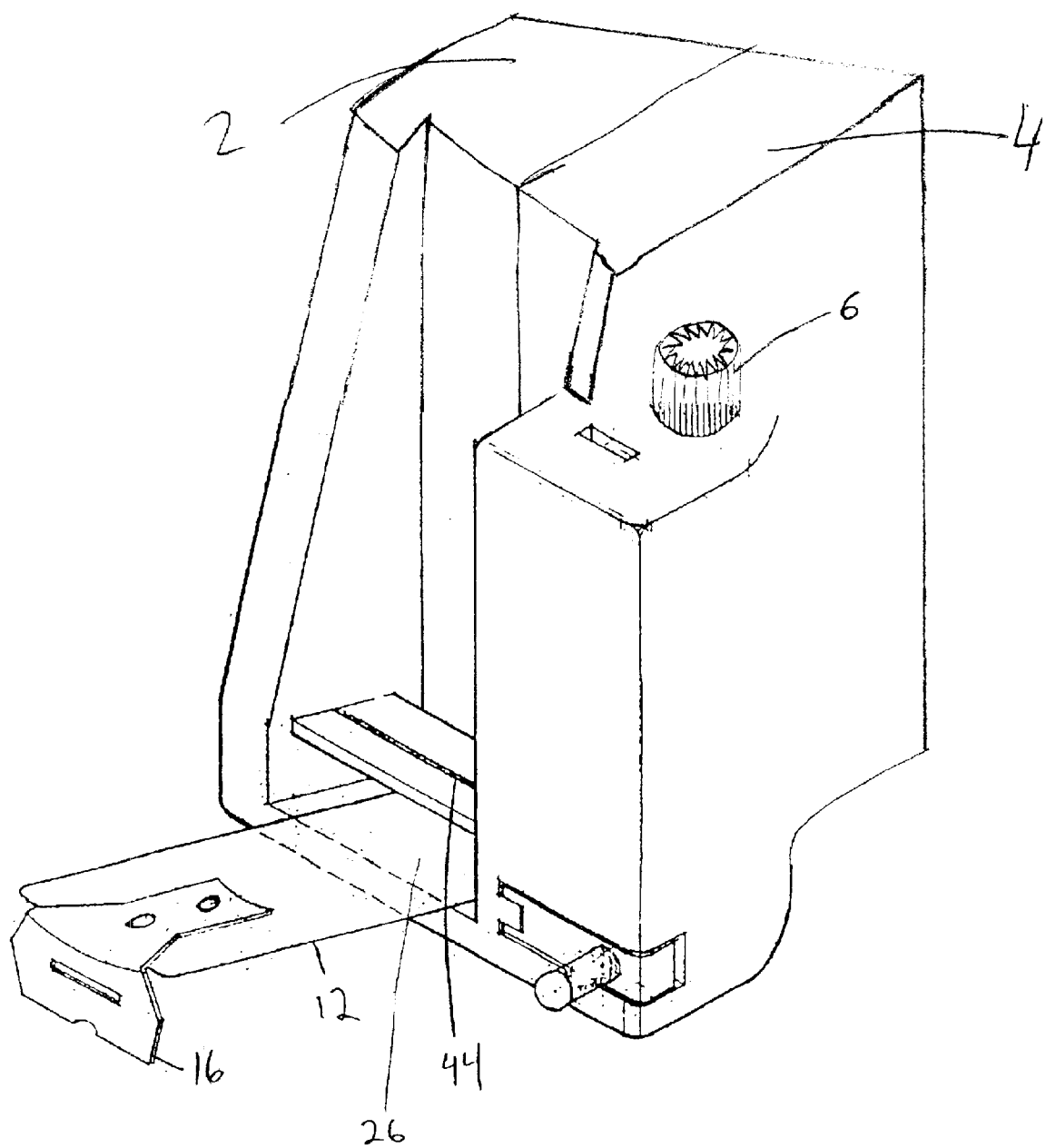
FIG. 1 is an isometric view of an embodiment of the present invention.

The present invention is at least an improvement on a commonly used measuring tape device. The invention allows for measurements and measurement marks or cuts to be made with precision, measuring to the smallest fraction of the marking of a tape measure. The invention also enables measurements and cuts with a blade to be made and the measured on a surface to be marked using one hand.

FIGS. 8g–8k show the preferred embodiment of a precision unit 30 according to the present invention. The unit has a top surface 31, back surface 32, a side surface 34, and a bottom surface 36. Additionally, the precision unit 30 includes a marker housing part 38 with a marker hold/release part 40 to allow the marker 42 to slide in and out of the marker housing part. Proximate to the bottom surface 36 of the unit is a viewing window 26 that includes an indicator line 44 that is inline with marker 42 and knife blade 28 and proximate to a tape thread part wherein the measuring tape element 12 exits the precision unit 30. A viewing window 26 is provided for viewing the measuring tape element 12. In the preferred embodiment, the material used for the precision unit 30 is plastic. The reason for the viewing window 26 to be made from clear material is so that a user can view the measuring tape 50 located below the viewing window 26 which is inline with indicator line 44 and with marker 42 and knife blade 28. Thereafter, the user can make a mark with the marker 42 and/or make a cut with the knife blade 28. For example, the tool may be used to measure and cut sheetrock.

Figure 7:
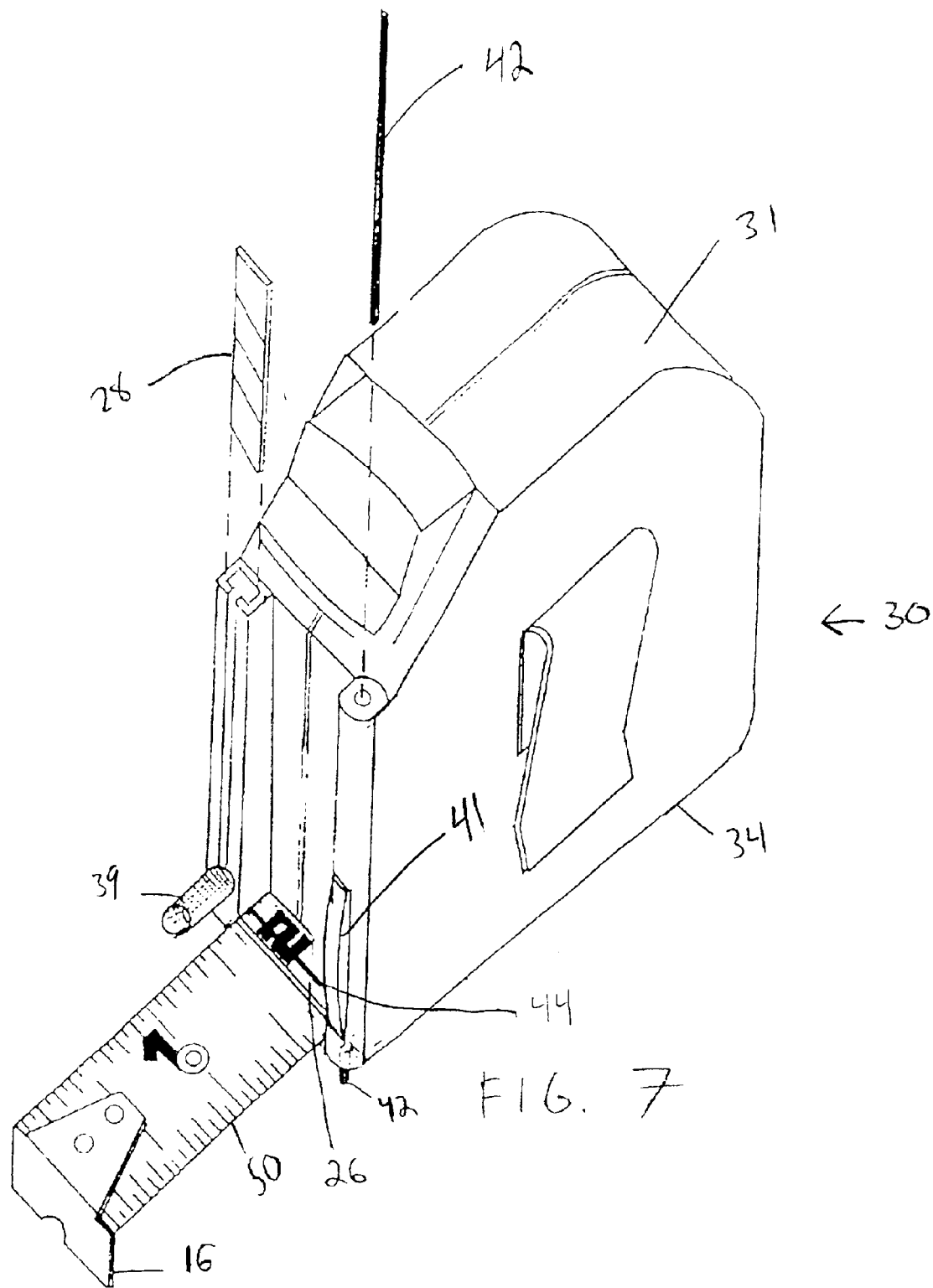
FIG. 7 is an isometric view of an embodiment of the present invention.

The marker holding part 38 can be circular in its cross section or as shown in FIG. 7, or it can be rectangular as shown in FIG. 8i. The marker holding part 38 is hollow and includes a partial cutout 48 preferably located on a side most easily accessible to the workman's thumb or finger, while the precision unit 30 is held in the palm of the hand. The hold/release part 40 is attached to a marker 42 and is inserted into the hollow opening 48. With a twist of a user's finger, the hold/release part 40 releases the marker to move it down the marker housing part 38 far enough to make a mark on a surface being measured. When the user is assured that the marker 42 is moved far enough to make a mark, the hold/release part 40 can be manipulated to fasten the marker 42 in place via stalk 40a as shown in FIG. 8. The marker housing part 38 and its hollow opening 48 is positioned relative to unit 30 in such a manner as to assure that any mark made by the marker 42 on the surface being measured coincides or exactly overlaps the location of the indicator line 44 on the bottom surface 36. A lead holder 6 may also be provided for storing lead.

The location of the side surface 34 and of the marker holding part 38 can be alternated depending on the workman's preference. The marker hold/release part 40 can be any fastener that enables easy release and/or holding of the marker with only a thumb or a finger, while the rest of the hand is used for holding the measuring tape element 12 without requiring use of the other hand.

After positioning the precision unit to a position where a mark should be made, the user uses a thumb or another finger, depending on how the present invention is grasped, on marker hold/release part 40 to move the marker 42 down the marker holding part 38 and to fasten it in place. Looking through the viewing window 26 the user makes sure that the indicator line 44 coincides with the exact measurement mark 18 on the tape element 12. All that is left now is to make a slight wrist movement of the hand holding the tape measure 1, against a surface being measured to make a mark with the marker 42. Similarly, knife blade 28 may be positioned to make cuts by adjusting blade holder release knob 39.

Moreover, the present invention is capable of making, cutting, or marking, precision measured circles or arcs, again using only one hand if need be. This can be achieved in the following way: attaching the lip 16 of the measuring tape element 12 to a surface, this can be achieved, for example, by hooking it on a pre-existing staple or nail or nailing it in through the hole 8, extending the tape to a desired radius, using one hand to adjust the marker hold/release part 40 and drawing a partial or full circle (not shown).

Figure 2A:
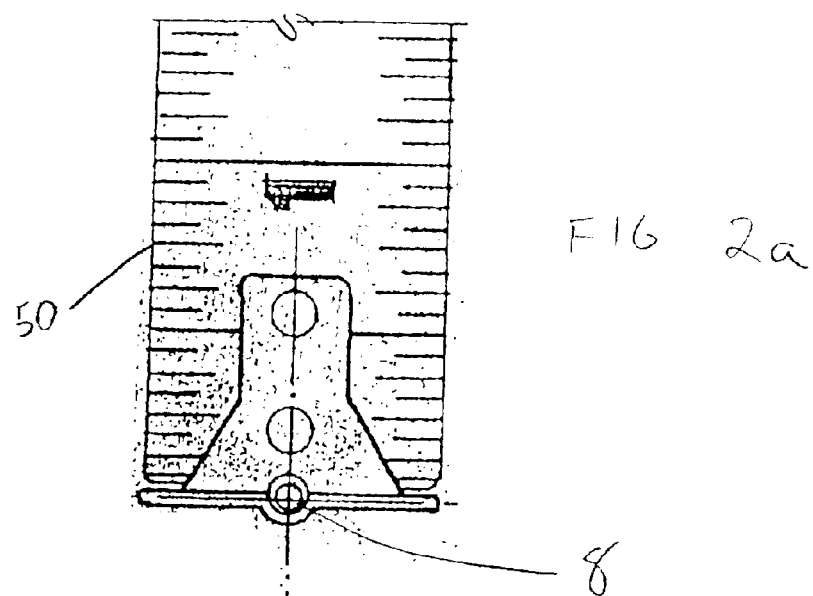
FIG. 2a is a plan view of the end of an embodiment of the present invention measuring tape 50 with a hole at the exact zero measurement point for inserting a nail.
Figure 2B:
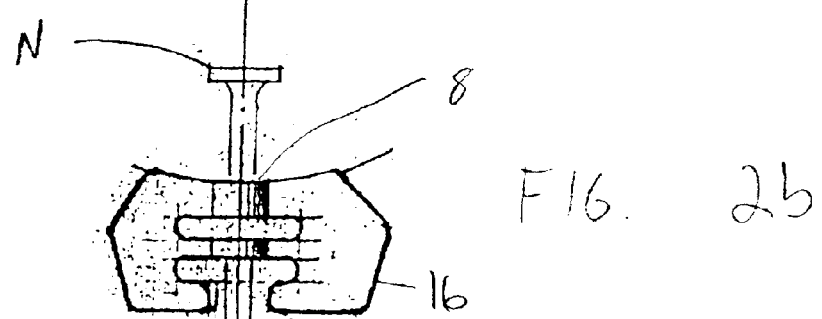
FIG. 2b is a front view of an embodiment of the end of the present invention measuring tape 50 showing insertion of a nail.
Figure 2C:
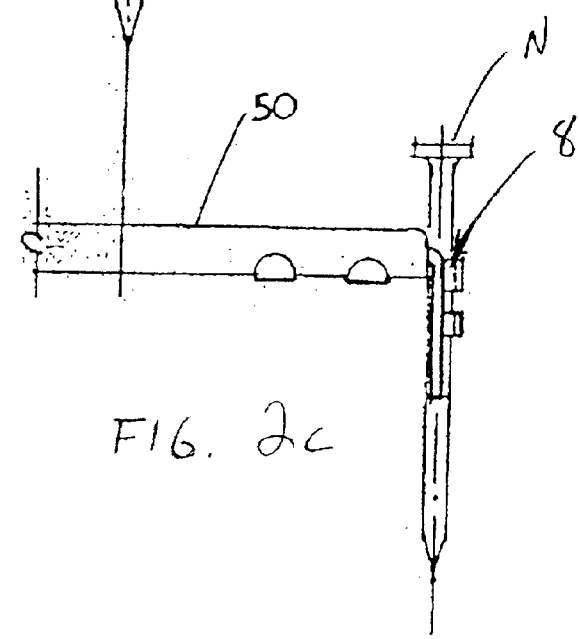
FIG. 2c is a side view of an embodiment of the end of the present invention measuring tape 50 showing insertion of a nail.
Figure 3:
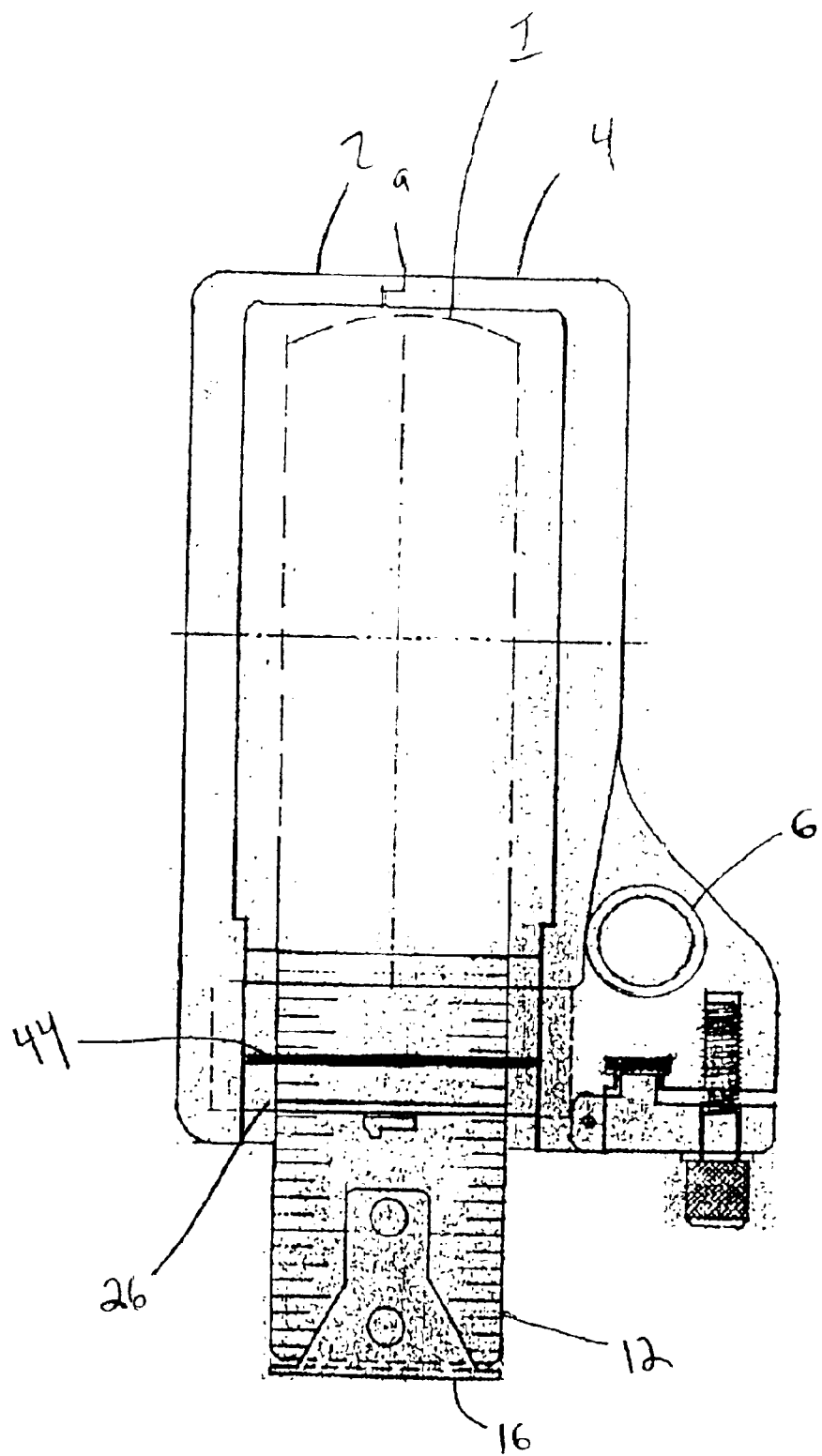
FIG. 3 is a plan view of an embodiment of the present invention.
Figure 4:
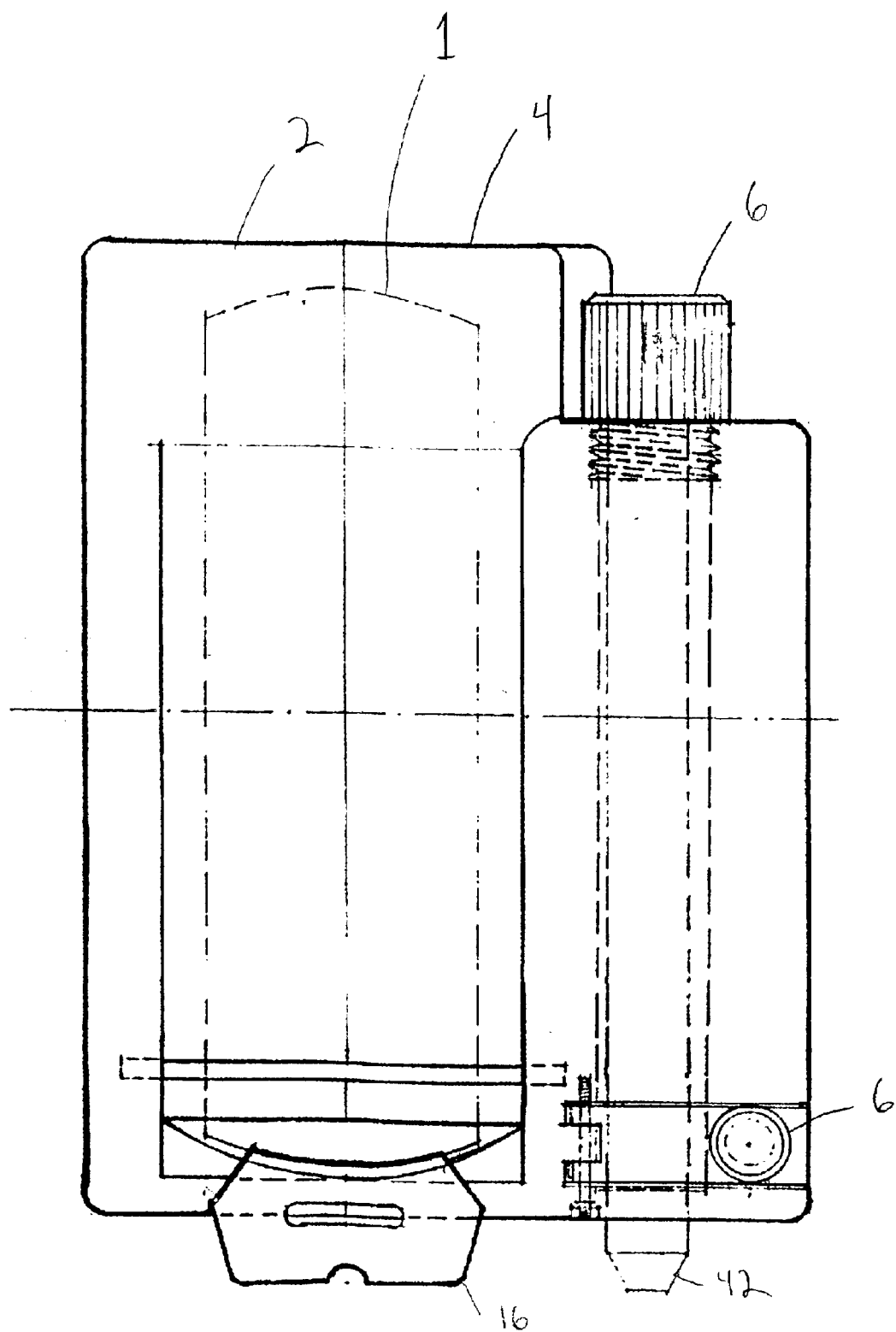
FIG. 4 is a front elevation of an embodiment of the present invention with first and second shell casings.
Figure 5:
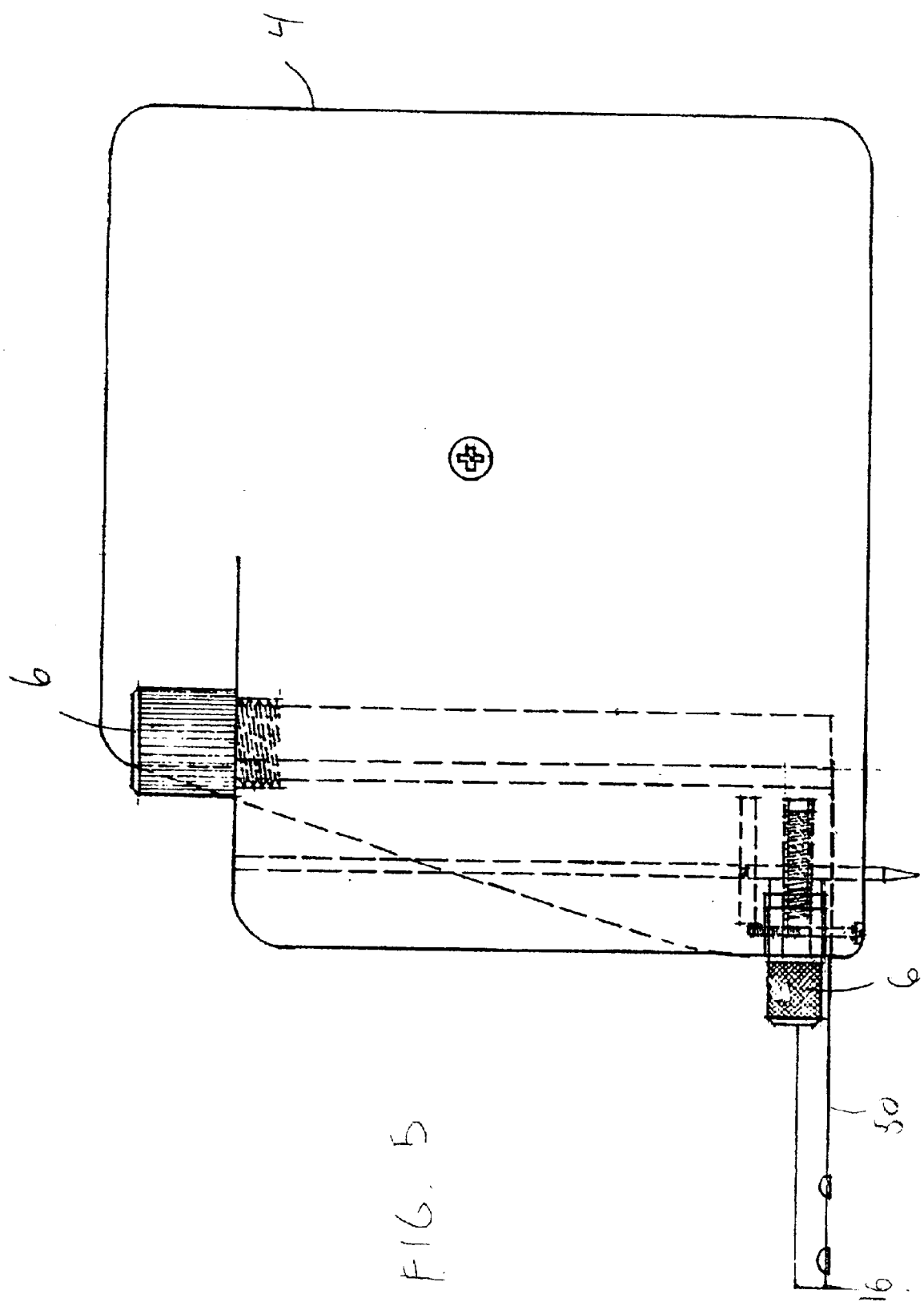
FIG. 5 is a side elevation of an embodiment of FIG. 4.

Reference is now made to an alternative embodiment shown in FIGS. 1, 3, 4, and 5. This embodiment uses a first concave shell casing 2 and a second concave shell casing 4 which are placed together to surround a standard sized rectangular hand held tape measure 1. A standard sized tape measure may be various sizes, but for example, the encased standard tape measure 1 may be 3"×3"×1". The invention contemplates providing different sized shell casings for larger or smaller tape measures as needed. As shown in FIG. 2, the shell casings are force fit together and may use any manner of adjustable attachment means 9 including screws (not shown) to fasten the shell casings to each other. In this way, any standard tape measure 1 may be converted to use the features discussed above in reference to the preferred embodiment including the viewer window 26, indicator line 44, and marker 42.

Figure 6:
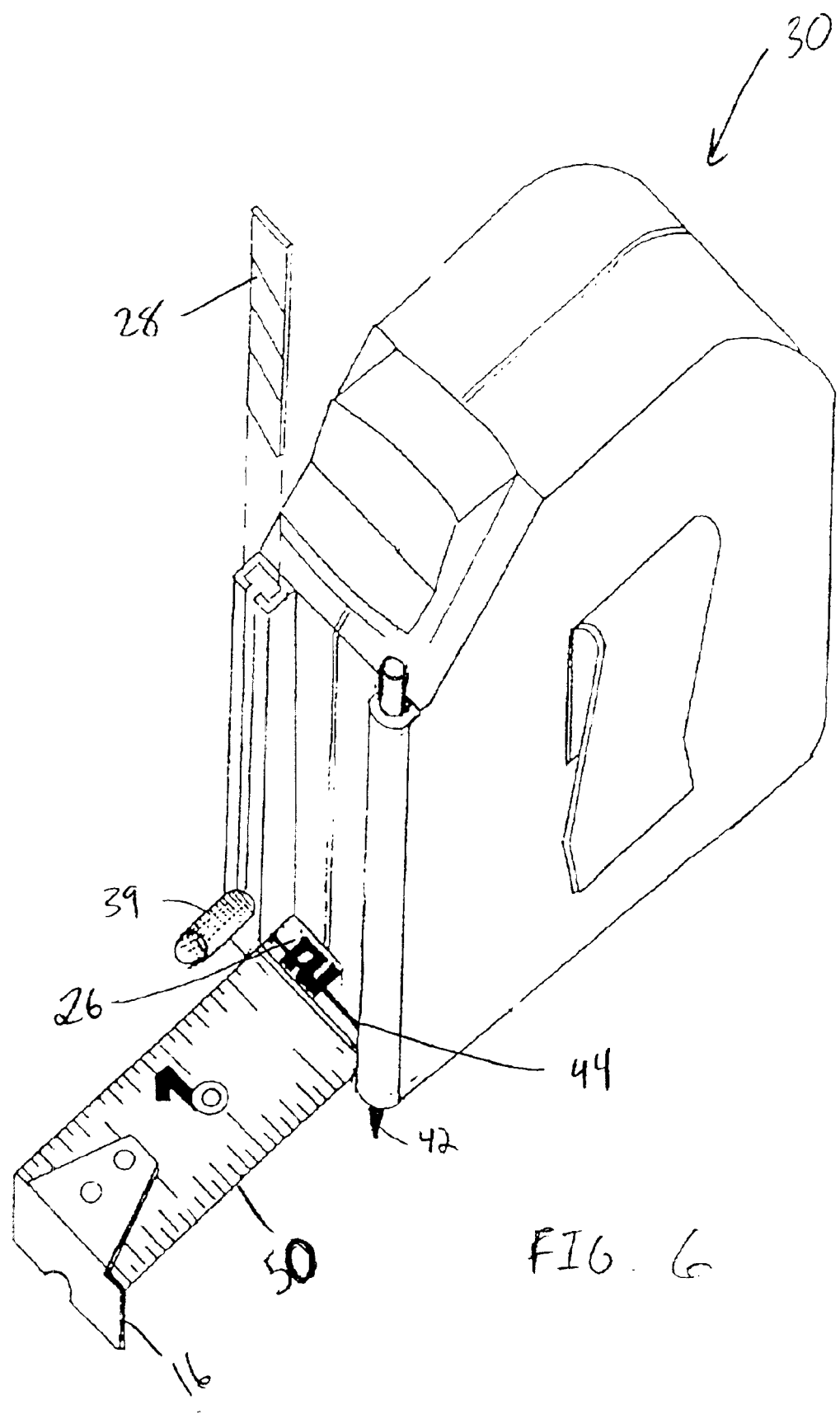
FIG. 6 is an isometric view of an embodiment of the present invention.

The marker 42 in all embodiments is not limited to lead, but may be a lead pencil, pen, chalk, or other marking material. It may also have a top part 42a. FIGS. 6 and 7 are presented to show use of a round marker 42 held in an integrated mechanical lead pencil 41 of with standard mechanical lead pencil inner parts (not shown).

FIGS. 8a–8e are identical to the preferred embodiment described above except that a hole 8 is not included for insertion of a nail or tack as in the preferred embodiment.

FIGS. 9 and 9b show a different embodiment with differently shaped shell casings 2a and 4a. These shell casings universally fit together around a standard tape measure 1 and use conformable rubber pads 3 mounted pad holders 5 to further hold the standard tape measure 1.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A combination of a shell casing for enclosing a tape measure and an integrally formed marker housing, comprising:

a first shell;

a second shell;

an attachment element that attaches said first shell to said second shell thereby enclosing the tape measure, said casing having a bottom surface that rests on an object to be measured and having a vertical recess at its front portion;

an indicator window located in the vertical recess and having an indication mark positioned to be in line with measurement increments arranged on said tape measure;

an exit slot disposed near a bottom surface of said casing and through which the tape measure slides out;

a said marker housing integrally formed with said casing and disposed proximate the vertical recess and adjacent to said casing such that a bottom surface of said marker housing is substantially coplanar with the bottom surface of said casing to minimize the vertical distance of the tape measure from the object to be measured, said marker housing receiving a marker wherein the marker is aligned with the indication mark in said indicator window, and said marker housing and the marker are positioned above the to allow marking of the object at the measurement increment that is in line with the indication mark using one and only one hand.

2. The combination of claim 1 wherein:

the marker is a blade and is aligned with the indication mark.

3. The combination of claim 2 wherein the marker is a lead pencil received in said marker housing.

4. The combination of claim 2 wherein the marker is a retractable lead pencil received in said marker housing.

5. The combination of claim 1 wherein:

the marker is a retractable blade received in said marker housing.

6. The combination of claim 1 wherein:

said tape measure includes a nail hole at its exposed end.

7. The combination of claim 1, wherein said indicator window is a clear indicator window and said indication mark includes an index line positioned to be in line with said measurement increments.

8. The combination of claim 1, wherein:

said indicator window is a clear indicator window; and said indicator window is positioned near the exit slot and directly above the tape measure exiting the exit slot.

9. The combination of claim 1, wherein the casing and the marker housing are formed as a unitary construction.

10. A combination tool comprising:

a tape measure in a case, said case having a bottom surface that rests on an object to be measured and having a vertical recess at its front portion;

an indicator window located in the vertical recess and having an indication mark positioned to be in line with measurement increments arranged on said tape measure;

an exit slot disposed near a bottom surface of said case and through which the tape measure slides out;

a retractable cutting blade housing integrally formed with said case and disposed proximate the vertical recess and adjacent to said case such that a bottom surface of said housing is substantially coplanar with the bottom surface of said case to minimize the vertical distance of the tape measure from the object to be measured, said housing receiving a retractable cutting blade wherein the cutting blade is aligned with the indication mark in the window so as to allow marking of or making of a cut on the object at the measurement increment that is in line with the indication mark using one and only one hand.

11. A combination tool comprising:

a tape measure in a case, said case having a bottom surface that rests on an object to be measured and having a vertical recess at its front portion;

an indicator window located in the vertical recess and having an indication mark positioned to be in line with measurement increments arranged on said tape measure;

an exit slot disposed near a bottom surface of said case and through which the tape measure slides out;

a marker housing integrally formed with said case and disposed proximate the vertical recess and adjacent to said case such that a bottom surface of said housing is substantially coplanar with the bottom surface of said case to minimize the vertical distance of the tape measure from the object to be measured, said housing and receiving a marker wherein said marker is aligned with the indication mark in the window and said marker is positioned to marking to allow marking of the object at the measurement increment that is in line with the indication mark using one and only one hand.

12. The combination tool of claim 11 wherein:

said marker is adapted to use interchangeable leads or limestone.

13. The combination tool of claim 11 wherein:

said marker is a mechanical lead pencil received in said marker housing.

14. The combination tool of claim 11 wherein said indicator window is a clear indicator window and said indication mark includes an index line positioned to be in line with said measurement increments.

15. The combination tool according to claim 11, wherein said marker housing is a first marker housing, further comprising a second marker housing integrally formed with said case, wherein said first and second marker housings are disposed on opposite sides of said indicator window.

16. The combination tool according to claim 15, wherein said first marker housing is adapted to receive a blade and said second marker housing is adapted to receive a pencil or a pen.

* * * * *